W. LINK.
ANIMAL POKE OR HALTER.
APPLICATION FILED SEPT. 13, 1919.
1,335,118.
Patented Mar. 30, 1920.
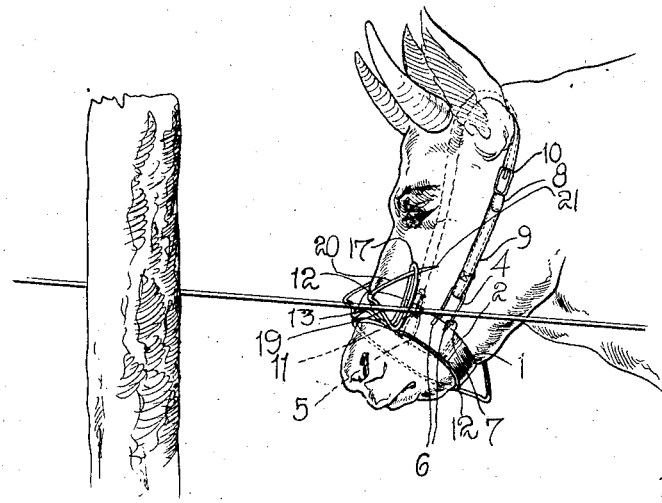
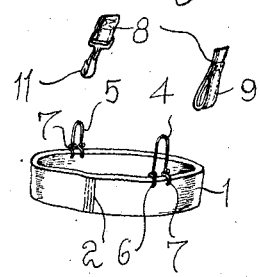
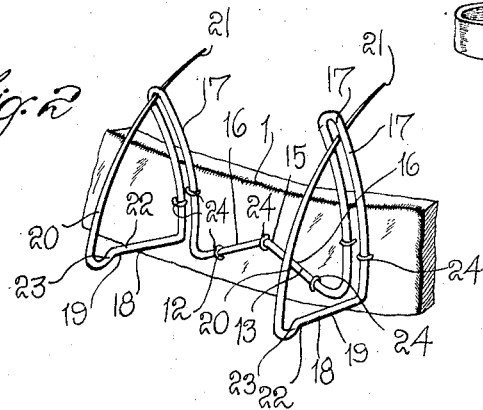
Inventor
William Link
By Watson E. Coleman
Attorney

UNITED STATES PATENT OFFICE.

WILLIAM LINK, OF UPPER SANDUSKY, OHIO, ASSIGNOR OF ONE-HALF TO JAMES R. CALDWELL, OF UPPER SANDUSKY, OHIO.

ANIMAL POKE OR HALTER.

1,335,118.  Specification of Letters Patent.  Patented Mar. 30, 1920.

Application filed September 13, 1919. Serial No. 323,616.

*To all whom it may concern:*

Be it known that I, WILLIAM LINK, a citizen of the United States, residing at Upper Sandusky, in the county of Wyandot and State of Ohio, have invented certain new and useful Improvements in Animal Pokes or Halters, of which the following is a specification, reference being had to the accompanying drawings.

This invention relates to an improved animal poke or halter, and an object of the invention is to provide a device of this kind particularly adapted to be worn by an animal, thereby preventing the animal from reaching through wire fences, tending to knock down or distort the fence, in an attempt to graze on the other side of the fence.

A further object of the invention is to provide a device of this kind, particularly adapted for weaning the animal, as well as preventing the animals from sucking themselves, more particularly cows.

The invention further aims to provide a poke comprising a leather band or strap engaging over the nose and the under jaw of the animal, there being means engaging over the head back of the ears of the animal to retain the band or strap in place, in combination with members securely attached to the band or strap, to contact with the wires of the fence, or the rails of the fence, thereby preventing the animal from reaching its head between the wires or rails of the fence.

A further object of the invention is the provision of wire members, so mounted on the band or strap and constructed, whereby when the animal attempts to reach between the wires or rails of the fence, sharp pointed arms of the members will be actuated or pushed toward the upper part of the nose or under the jaw of the animal, tending to pierce the flesh, in which case the animal will withdraw from between the wires or rails of the fence.

A further object of the invention is to construct animal pricking or torturing members of single pieces of wire, each being bent to form a body portion, which is secured to the band or strap and having loop arms, the end portions of which wire being bent to form angular parts, certain arms of which protrude through the loop arms and are sharpened, so that in case the animal endeavors to reach between the wires or rails of the fence, the angular parts will engage the wires, and the strap or band will be distorted sufficiently, or the pointed arms will move through the loop arms, so that the sharpened ends will prick the flesh of the animal, which will cause the animal to withdraw from between the wires or rails of the fence.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a perspective view showing the improved animal poke or halter as applied to the head of a cow, showing the head in a position, in the act of protruding between the rails or wires of the fence, showing the angular parts of said poke in contact with the wires or rails of the fence, and the sharpened arms in the act of pricking the skin of the animal.

Fig. 2 is an enlarged detail perspective view of one of the members carried by the band or strap.

Fig. 3 is an enlarged detail perspective view of the band, showing the diametrically opposite loops 4 and 5, and the connections 9 and 11 to engage the loops 4 and 5.

Referring more especially to the drawings, 1 designates a band, which in the present instance is constructed from a heavy leather strap, though not necessarily, and which fits over the nose and under the lower jaw of the head of the animal. This band is constructed by fastening the opposite ends of the strap or the like securely together by stitchings, as indicated at 2.

At diametrically opposite portions of the band wire loops 4 and 5 are attached. Each loop 4 and 5 is constructed from a single length of wire, the end of the arms of the loop are inserted through apertures 6 of the band and are formed into eyes, and have their terminal portions coiled above the arms of the loop as indicated at 7. In this manner the loops are securely attached to the band.

A halter strap or retainer for the band is provided. One end of this strap 8 is formed into a loop 9, to engage the wire loop 4, there being a buckle 10 carried by one end of the loop 9, for regulating the size of the loop 9, as well as regulating the halter strap, so as to fit animal heads of different sizes. The other end of the halter or retainer strap is provided with a snap hook 11 to engage the wire loop 5. When the poke is worn on the head of the animal, the band fits over the nose and the end of the jaw of the head of the animal, while the halter or retainer strap engages over the head behind the ears thereof.

Secured at diametrically opposite portions of the band at points above the nose and under the lower jaw of the head of the animal are members 12. Obviously, these members are designed for the purpose of preventing the animal from reaching between the wires or rails of the fence in an attempt to graze on the other side of the fence. Each member 12 is constructed from a single length of wire, though not necessarily, which is bent to form a body 13. The part 14 of the body of the member is bent as shown at 15, to provide parts 16, which are disposed at an obtuse angle. The body of the member 12 is provided with loop arms 17, and beyond the loop arms 17, the wire is bent to form the angular elements 18, comprising the parts 19 and 20, which are at acute angles to each other. The parts or arms 20 slidably engage through the ends of the loop arms 17, and have their terminals sharpened as shown at 21. The parts 19 of the angular portions adjacent where they are arranged at an acute angle to the parts 18 are bent as shown at 22, thereby forming the portions 23, which will insure engagement with the wires or rails of the fence, to prevent the angular portions from passing the wires or rails of the fence in an attempt of the animal reaching between the wires or rails. The portion 14 of the body of the member is secured by riveted staples or the like 24, to the band of the poke, though not necessarily, so as to insure firmness between the member and the band.

An animal when endeavoring to reach between the wires or rails of the fence, the angular portions will contact with the wires or rails, and owing to the pressure on the members, the band or strap around the nose of the animal, will either become distorted, or the sharpened arms will move through the loop arms and pierce the flesh of the animal, thereby causing the animal to withdraw from between the wires or rails. The members will operate in a similar manner, to prevent weaning of an animal, or prevent cows from sucking themselves.

The invention having been set forth, what is claimed as new and useful is:

1. In an animal poke, the combination with a band engaging over the nose and under the lower jaw of the head of the animal, of means to hold the band in such position on the head, wire members connected to the band at diametrically opposite portions adjacent the top of the nose and the under jaw of the animal, said members having sharpened arms, adapted to be actuated by contact with the wires or rails of the fence, to cause their sharpened ends to prick the flesh of the animal, which causes the withdrawal of the head of the animal from between the wires or rails.

2. In an animal poke, the combination with a band engaging over the nose and under the under jaw of the animal and provided with diametrically opposite pivoted side loops, of means engaging the opposite side loops and over the head of the animal to retain the band in position, wire members fixedly attached to the band at diametrically opposite portions adjacent the top and the under jaw of the animal, each wire member comprising a body having parallel angular parts, said parallel angular parts having sharpened arms, which will be actuated to prick the flesh of the animal when the angular parts contact with the fence wires or rails, during the time the animal attempts to reach between the wires or rails of the fence.

3. In an animal poke, the combination with a band fitting over the top of the nose of the animal and under the under jaw thereof, of a halter strap engaging over the head of the animal, means carried by diametrically opposite parts of the band, to which the opposite ends of the halter strap are detachably connected, to retain the band on the animal, members secured to diametrically opposite parts of the band adjacent the top of the nose and the under jaw of the head of the animal, said members comprising parallel angular parts having loop arms and sharpened arms, the sharpened arms being guided through the loop arms and adapted to prick the flesh of the animal, when the parallel angular parts engage the fence or rails during the time that the animal attempts to reach between the wires or rails of the fence.

In testimony whereof I hereunto affix my signature.

WILLIAM LINK.